United States Patent
Moyna

(10) Patent No.: US 6,719,349 B2
(45) Date of Patent: Apr. 13, 2004

(54) TAILGATE ASSEMBLY

(75) Inventor: John P. Moyna, Elkader, IA (US)

(73) Assignee: Caterpillar S.A.R.L., Geneva ( * ) Notice: Subject to any disclaimer, the term of this patent is extended or adjusted under 35 U.S.C. 154(b) by 0 days.

(21) Appl. No.: 10/094,535

(22) Filed: Mar. 8, 2002

(65) Prior Publication Data

US 2004/0032141 A1 Feb. 19, 2004

(51) Int. Cl.⁷ ............................................. B60P 1/267
(52) U.S. Cl. ........................... 296/50; 296/56; 414/557; 414/525.54
(58) Field of Search .............................. 296/50, 56, 51, 296/57.1, 37.1, 61, 117; 298/235; 414/517, 525.54, 537, 293, 557, 525.52, 525.51, 501, 558, 487, 502; 253/118; 56/341; 224/42.21

(56) References Cited

U.S. PATENT DOCUMENTS

| | | | |
|---|---|---|---|
| 3,602,381 A | * 8/1971 | Size et al. .................. | 414/557 |
| 3,696,951 A | 10/1972 | Toppins et al. | |
| 3,777,917 A | * 12/1973 | Herpich et al. ......... | 414/525.52 |
| 3,779,409 A | 12/1973 | Herpich et al. | |
| 3,815,764 A | 6/1974 | Gilfillan et al. | |
| 3,860,288 A | * 1/1975 | Martin et al. .................. | 296/56 |
| 3,874,529 A | * 4/1975 | Gollnick ............... | 414/525.51 |
| 3,884,372 A | * 5/1975 | Kunii ................... | 414/525.52 |
| 3,904,049 A | 9/1975 | Prahst | |
| 3,905,493 A | * 9/1975 | Logue ......................... | 296/56 |
| 3,929,243 A | * 12/1975 | Smith ......................... | 414/501 |
| 3,953,170 A | 4/1976 | Webb | |
| 4,029,224 A | * 6/1977 | Herpich et al. ......... | 414/525.52 |
| 4,044,914 A | 8/1977 | Hopkins et al. | |
| 4,050,594 A | * 9/1977 | Gollnick ............... | 414/525.54 |
| 4,065,008 A | * 12/1977 | Ratledge ............... | 414/525.54 |
| 4,071,153 A | 1/1978 | Booher | |
| 4,079,988 A | * 3/1978 | Randall ..................... | 296/57.1 |
| 4,147,261 A | * 4/1979 | Dautel et al. .............. | 414/557 |
| 4,180,365 A | 12/1979 | Herpick et al. | |
| 4,260,317 A | 4/1981 | Martin et al. | |
| 4,305,694 A | * 12/1981 | Chan .......................... | 414/537 |

(List continued on next page.)

FOREIGN PATENT DOCUMENTS

| | | | |
|---|---|---|---|
| DE | 27 42 045 | * | 4/1978 |
| DE | 26 51 258 | * | 5/1978 |
| EP | 0 031 000 | * | 7/1981 |
| EP | 0 410 917 | * | 1/1991 |
| EP | 1 036 698 | * | 9/2000 |
| GB | 2 167 036 | * | 5/1986 |
| GB | 2 318 341 | * | 4/1998 |

Primary Examiner—Kiran Patel
(74) Attorney, Agent, or Firm—James R Smith

(57) ABSTRACT

Trucks and other work machines require strong and easily operated and maintained tailgate assemblies. Often, the operating structure of the tailgate assembly requires precise alignment and relatively large clearance space to operate effectively. The operating structure is also commonly under great stresses from the tension and compression forces that power the operating structure to move the tailgate. A tailgate assembly including a tailgate and an; operating structure is provided. The tailgate is attached to a platform in a hinge d manner and allowed to move pivotally with respect to the platform. The operating structure includes a linear actuator and a linking member. The linear actuator is attached to the platform. The linking member has a first end portion pivotally attached to the linear actuator, a fulcrum pivotally attached to the platform, and a second end portion attached to a tracking member. The tracking member is adapted to contact the tailgate and to move vertically with respect to the tailgate. The use of the tracking member helps eliminate stresses and alignment requirements in the operating structure. The linking member may be used in a relatively small clearance space. The tailgate assembly of the present invention is a robust design, suitable to a high stress work machine environment.

8 Claims, 6 Drawing Sheets

U.S. PATENT DOCUMENTS

| | | | |
|---|---|---|---|
| 4,307,541 A | * 12/1981 | Farmer et al. | 296/56 |
| 4,405,279 A | * 9/1983 | Davy et al. | 414/558 |
| 4,516,904 A | 5/1985 | Simmons | |
| 4,569,626 A | * 2/1986 | Svanberg | 414/557 |
| 4,836,736 A | * 6/1989 | Neagu | 414/557 |
| 4,930,973 A | * 6/1990 | Robinson | 414/557 |
| 4,991,890 A | * 2/1991 | Paulson | 293/118 |
| 5,123,801 A | * 6/1992 | O'Daniel | 414/517 |
| 5,158,340 A | 10/1992 | Boda | |
| 5,367,865 A | * 11/1994 | Jennings et al. | 56/341 |
| 5,456,521 A | 10/1995 | Moyna | |
| 5,498,066 A | 3/1996 | Cuthbertson et al. | |
| 5,498,067 A | * 3/1996 | Christenson | 298/23 S |
| 5,518,287 A | * 5/1996 | Totani | 296/50 |
| 5,816,766 A | 10/1998 | Clark | |
| 5,819,516 A | * 10/1998 | Anderson et al. | 56/341 |
| 5,857,822 A | * 1/1999 | Christenson | 414/517 |
| 6,062,804 A | 5/2000 | Young et al. | |
| 6,067,021 A | * 5/2000 | Huber | 296/117 |
| 6,079,933 A | 6/2000 | Moyna et al. | |
| 6,102,644 A | 8/2000 | Young et al. | |
| 6,155,776 A | 12/2000 | Moyna | |
| 6,176,673 B1 | 1/2001 | Moyna et al. | |
| 6,206,477 B1 | * 3/2001 | Rexus et al. | 414/487 |
| 6,234,739 B1 | * 5/2001 | Smith et al. | 414/525.54 |
| 6,386,818 B1 | * 5/2002 | Reed | 414/502 |
| 6,485,079 B1 | * 11/2002 | Brown et al. | 296/50 |

* cited by examiner

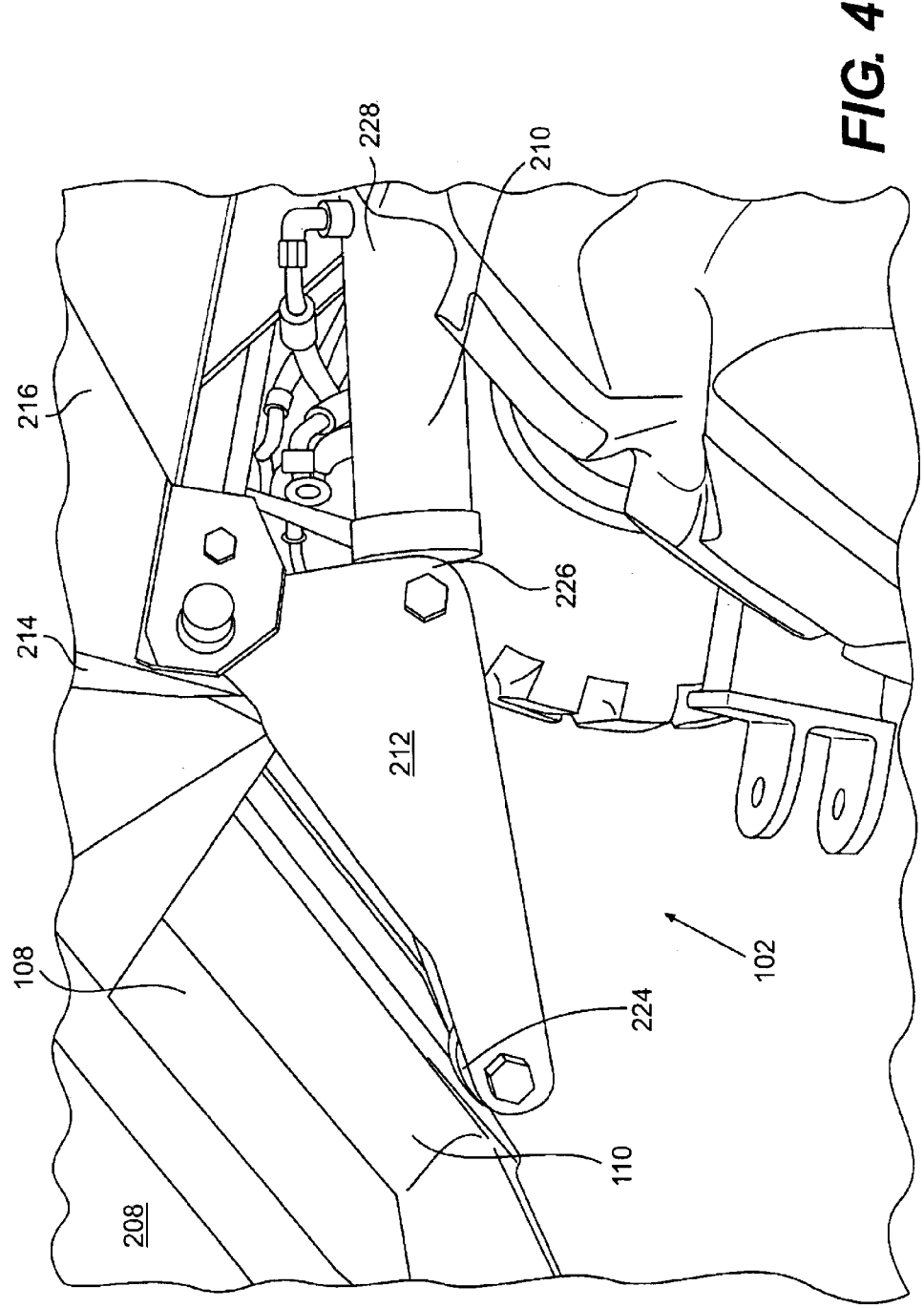

TAILGATE ASSEMBLY

TECHNICAL FIELD

The present invention relates generally to a tailgate assembly, and more specifically to a tailgate assembly having an tracking support member for the tailgate.

BACKGROUND

Work machines are used in earth moving operations to move material, such as dirt and rock, from one point to another. Two types of work machines are commonly used in the industry to perform this task: dump trucks and ejector trucks. Both types of trucks have a receptacle body to carry the material being moved. A dump truck tilts the body to release the material, and an ejector truck pushes the material out the back of the body with an ejector blade. Both dump trucks and ejector trucks may be provided with a tailgate. The tailgate serves to keep the material in the body until the operator wishes to release the material. Dump truck tailgates can be simple in design and operated by gravity and/or the weight of the material being dumped. Ejector truck tailgates are of particular interest, as this type of tailgate is normally powered, often with a hydraulic cylinder, and also may be used to help control the spreading of the material being ejected from the body.

International application No. WO 99/15357, published Apr. 1, 1999 (hereafter referenced as '15357) discloses a tailgate assembly having an operating structure. The operating structure includes a pair of projecting brackets extending from and affixed to the exterior surface of the tailgate for supporting one end of a rigid link at a rotatable first pivot. The opposite end of the link may be pivotally attached at a second pivot to a coupling member which is shown as triangular in shape. A first corner of the coupling member is connected to the link at the second pivot. A second corner of the coupling member may be affixed to the underside of the truck body at a third pivot about which the coupling member rotates. A third corner of the coupling member includes a fourth pivot connected to one end of an extendable cylinder. The opposite end of the extendable cylinder is affixed at a fifth pivot to the underside of the truck body at a sixth pivot. As the cylinder extends and retracts, it moves the fourth pivot forward and rearward, respectively, thus moving the third corner of the coupling member and pivoting the member about its own third pivot at the second corner. The coupling member, in essence, acts as a bell crank in manipulating the tailgate.

While the '15357 design has performed well, room for improvement exists. For example, the '15357 design includes a number of pivot points, all of which need to be greased or maintained regularly and the jamming or binding of any of which would cause difficulty in operating the tailgate as intended. The triangular coupling member is under stress forces from many directions and must be made in a very robust manner to withstand the constant tension and/or compression forces. The triangular coupling member must be of a certain profile and arrangement to accommodate the linkage lengths—this is shown in the drawings of '15357 as being almost an equilateral triangle. Therefore, a large clearance space must be maintained to allow the coupling member to move. Also, should the '15357 tailgate become bent or damaged, the relative movement of the pivot points may cause the operating structure to become inoperable to move the tailgate.

The present invention is directed to overcoming one or more of the problems set forth above.

SUMMARY OF THE INVENTION

In one aspect of the present invention, a tailgate assembly including a tailgate and an operating structure is provided. The tailgate is pivotally attached to a platform. The operating structure includes a linear actuator and a linking member. The linear actuator is attached to the platform. The linking member has a first end portion pivotally attached to the linear actuator, a fulcrum pivotally attached to the platform, and a second end portion attached to a tracking member. The tracking member is adapted to contact the tailgate and move vertically with respect to the tailgate.

In an aspect of the present invention, a work machine having a retention body and a tailgate assembly is disclosed. The tailgate assembly includes a tailgate pivotally attached to an end of the retention body and an operating structure. The operating structure includes a linear actuator attached to an underside of the retention body, a tracking member, and a linking member. The linking member has a first end portion pivotally attached to the linear actuator, a fulcrum pivotally attached to the retention body, and a second end portion attached to the tracking member.

In an aspect of the present invention, a method of operating a tailgate assembly of a work machine is disclosed. The tailgate assembly includes a tailgate and an operating structure. The tailgate has a lower portion and an upper portion vertically spaced from the lower portion. The operating structure has a linking member, an extendible linear actuator connecting a stationary surface and a first end of the linking member, and a tracking member connected to a second end of the linking member and slidably contacting a tailgate. The linking member is pivotally attached to the stationary surface at a fulcrum located between the first end and the second end. The method includes the steps of extending the linear actuator, rotating the linking member about the fulcrum in a first direction, and moving the tracking member from the lower portion of the tailgate to the upper portion.

DESCRIPTION OF THE DRAWINGS

FIG. 4 is a fragmentary side-perspective view with the tailgate open of a preferred embodiment of the present invention;

DETAILED DESCRIPTION

Figure 1:
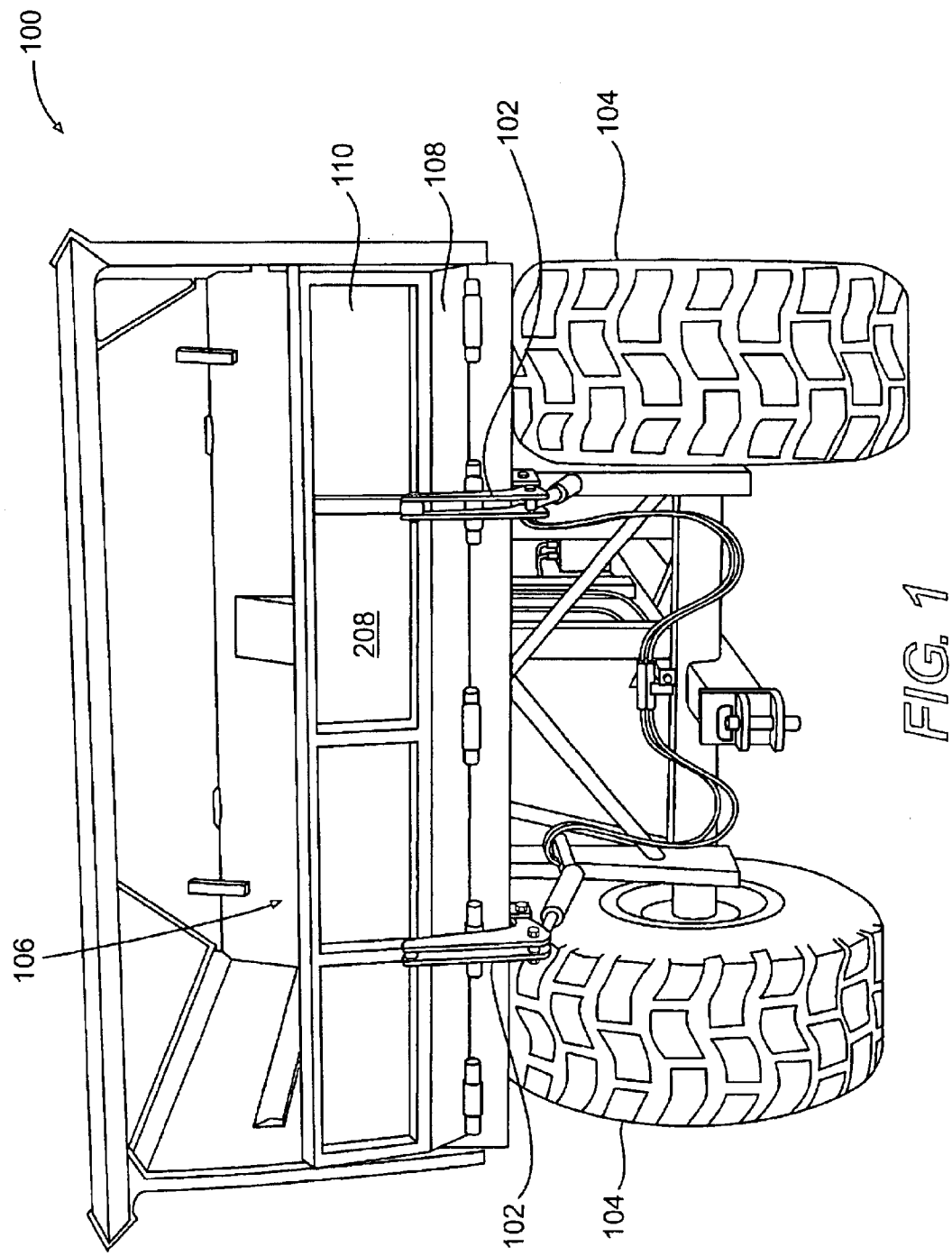
FIG. 1 is a fragmentary rear view of a work machine incorporating a preferred embodiment of the present invention.

FIG. 1 depicts a rear view of a work machine 100 including a tailgate assembly having an operating structure 102 according to the present invention. The work machine also includes a set of ground engaging devices 104 and a retention body, shown generally at 106. Two operating structures 102 are shown in FIG. 1. However, any suitable number of operating structures 102 can be used without departing from the present invention. The retention body 106 may have one or more sides, a shaped profile, or any other configuration without affecting the present invention.

Figure 2:
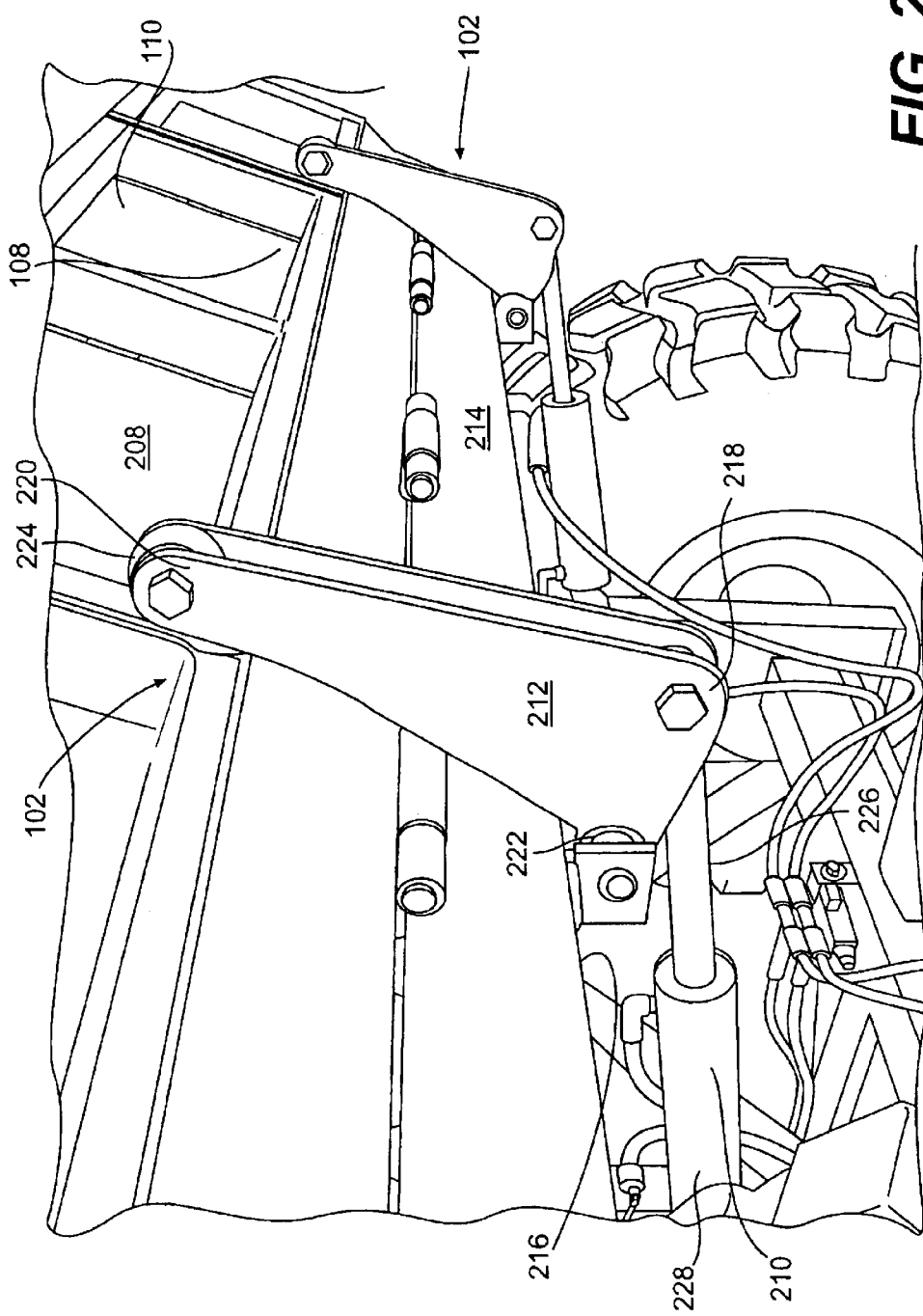
FIG. 2 is a fragmentary perspective view of a preferred embodiment of the present invention.

The operating structure 102 is shown in greater detail in FIG. 2. The tailgate assembly includes a tailgate 208 and an operating structure 102. The tailgate 208 is pivotally attached to the retention body 106 at an end thereof 214. This pivotal attachment is shown in FIG. 2 as being accomplished by multiple pinned hinges, but the attachment method does not form a material part of the present invention and could be accomplished by any suitable structure. The linear actuator 210 is attached to an underside 216 of the retention body 106. The linking member 212 has a first end portion 218, a second end portion 220, and a fulcrum 222, preferably located at a point noncoincident with the first and second end portions 218, 220. The fulcrum 222 is pivotally attached to the retention body 106. The first end portion 218 is pivotally attached to an end of the linear actuator 210 distant from the retention body 106. The second end portion 220 is attached to a tracking member 224.

Figure 3:
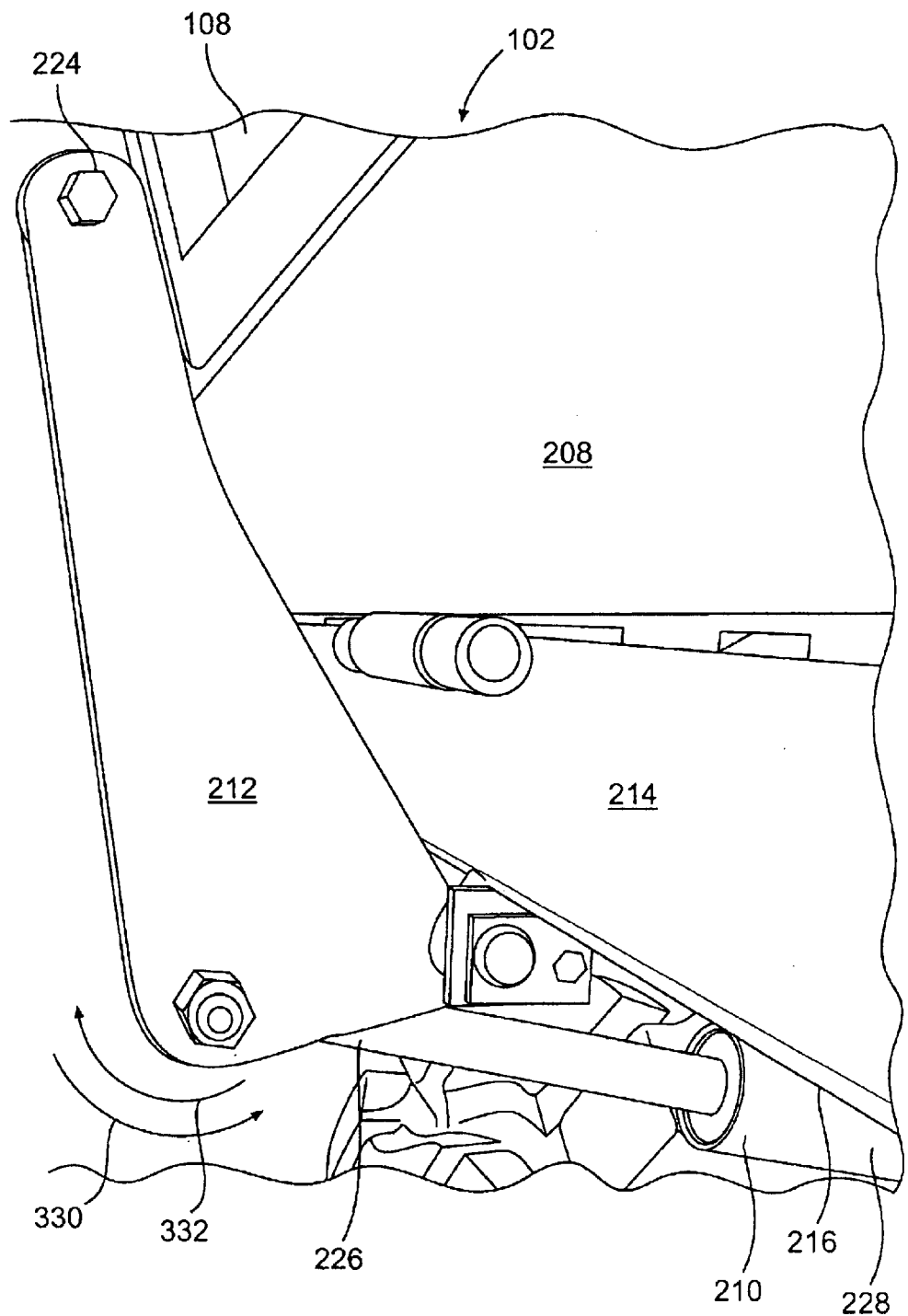
FIG. 3 is a fragmentary side-perspective view with the tailgate closed of a preferred embodiment of the present invention.
Figure 5A:
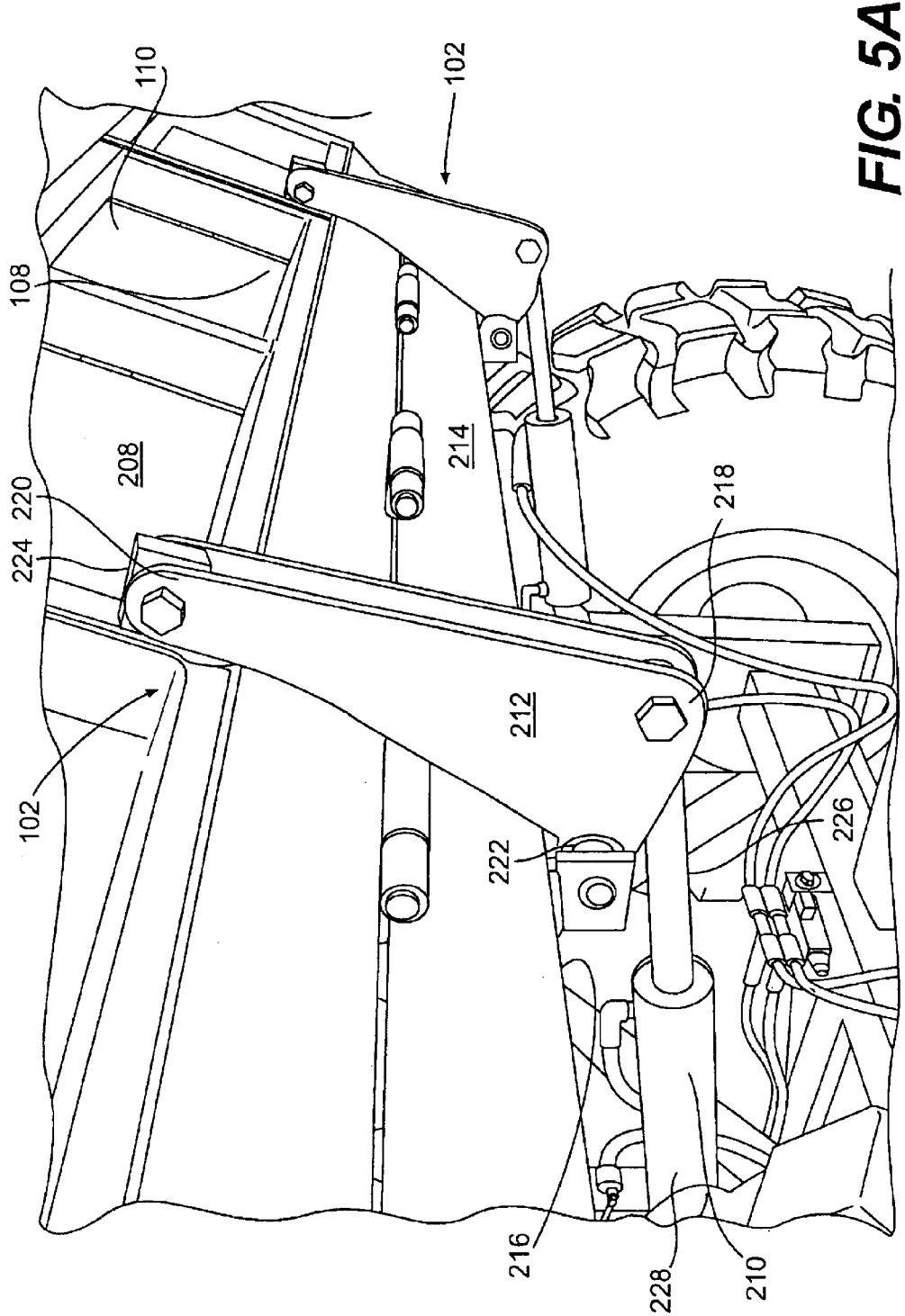
FIG. 5a is a fragmentary perspective view of a preferred embodiment of the present invention.
Figure 5B:
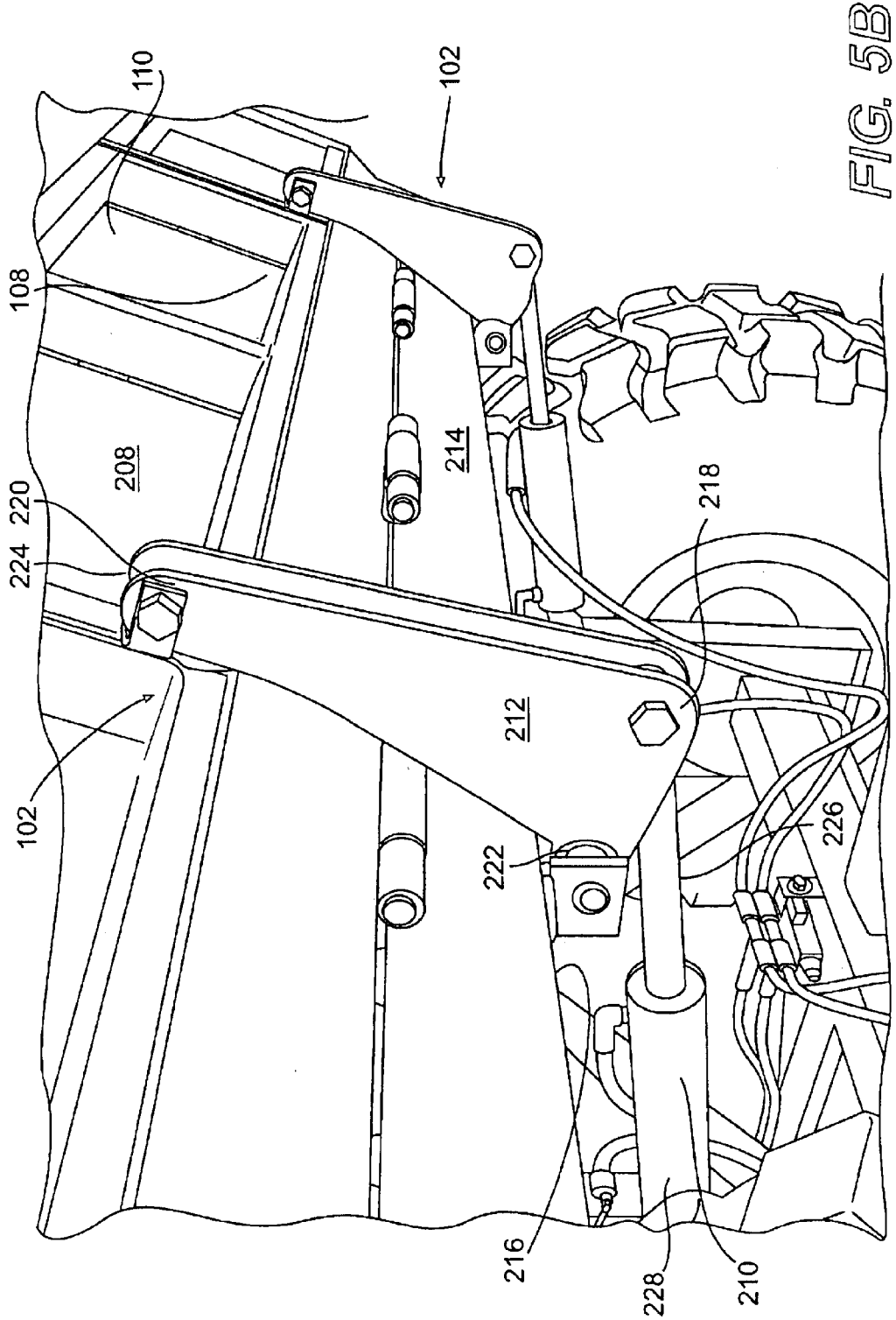
FIG. 5b is a fragmentary perspective view of a preferred embodiment of the present invention.

The tailgate 208 preferably has a lower portion 108 and an upper portion 110 spaced vertically from the lower portion 108. "Vertically" is used herein to refer to a vertical or up-and-down direction as seen from a frame of reference in which the tailgate remains stationary throughout its operation, as opposed to moving in the arcing motion seen by an observer on the ground. The tracking member 224 is adapted to move vertically between the upper and lower portions 108,110 of the tailgate 208. The tracking member 224 contacts the tailgate 208 in a supporting manner but is not affixed thereto. The motion of the tracking member 224 may be accomplished by rolling, sliding, traveling in a track, or any other suitable means. Any of these means may be referred to as a "slidable" form of contact. The tracking member 224 need not be a separate piece from the linking member 212, but may be an integral portion thereof. The tracking member 224 may be a roller, as shown in FIGS. 2, 3, and 4, or may be a sliding pad or wear pad as shown in FIG. 5a, sliding face or wear face as shown in FIG. 5b, or of any suitable shape or form. The exact configuration of the tracking member 224 is not essential to the present invention. Additionally, the tailgate 208 may include some sort of wear pad, track, or channel upon or within which the tracking member 224 rests or rides without departing from the spirit and scope of the present invention.

The linear actuator 210 may be a hydraulic cylinder or other piston-type mechanism, having a rod end 226 and a head end 228. One of the rod and head ends 226, 228 would then be attached to the retention body 106 in a suitable manner, and the other of the rod and head ends 226,228 would be pivotally attached to a first end portion of the linkage member 212. The linear actuator 210 may be powered by any desirable means, such as, but not limited to, hydraulic, electric, pneumatic, magnetic, or the like.

The linking member 212 is pivotally attached to the retention body 106 at the fulcrum 222 of the linking member 212. The fulcrum 222 may be located at the end 214, underside 216, or any other suitable area of the retention body 106. Optionally, the fulcrum 222 may be located between the linear actuator 210 and/or the point at which the linear actuator 210 is attached to the retention body 106, and the end 214 of the retention body 106. Industrial Applicability FIGS. 3 and 4 depict a closed and an open positioning, respectively, of a tailgate assembly according to the present invention. The work machine 100 normally is loaded and is moved with the tailgate 208 closed, and the tailgate 208 is then opened when the operator wishes to unload hauled material from the retention body 106. The present invention may be used on a dump truck, an ejector truck, an articulated truck, and the like. The present invention may also be used on any other suitable machines, including a trailer, perhaps towed behind a truck, tractor, or the like.

To operate the tailgate assembly, the linear actuator 210 is actuated. For the sake of simplicity, the linear actuator 210 will be referred to below as "extended" when the tailgate 208 is closed, and "retracted" when the tailgate 208 is open. However, it should be intuitively obvious to one skilled in the art that the condition of the linear actuator 210 at each of these tailgate 208 positions depends upon the shape, configuration, and mounting of the rest of the operating structure 102 components and upon the linear actuator 210 itself, and these terms of convenience should not be construed to limit the present invention.

When the tailgate 208 is closed, as shown in FIG. 3, the linear actuator 210 is extended. The tracking member 224 is therefore at a lower portion 108 of the tailgate 208. To open the tailgate 208, the linear actuator 210 is retracted. This causes the linking member 212 to rotate about the fulcrum 222 in a first direction 330. As the linking member 212 rotates, the tracking member 224 is moved toward the upper portion 110 of the tailgate 208. As the tracking member 224, which supports the tailgate, is moved, the tailgate moves with the linking member 212 and becomes open due to gravitational force and/or pressure from the hauled material. FIG. 4 illustrates the tailgate 208 in an open position and still resting on the tracking member 224. The tracking member 224 in FIG. 4 is contacting the upper portion 110 of the tailgate 208.

To close the tailgate 208, the linear actuator 210 is extended. The linking member 212 accordingly rotates about the fulcrum 222 in a second direction 332 and moves the tracking member 224 from the upper portion 110 of the tailgate 208 toward the lower portion 108. This motion "pushes" the tailgate 208 back into the closed position, as in FIG. 3.

Additionally, the tailgate 208 may be held in a partially open, or partially closed, position through partial actuation of the linear actuator 210. This technique is often used to help control spreading of the hauled material as it is being ejected from the work machine 100.

The operating structure of the present invention provides the desirable function of eliminating a pivot joint, which aids in assembly, maintenance, and operation of the tailgate. The tracking member disclosed herein helps to distribute the weight of the tailgate over a larger area than shown in the prior art. The present invention also will generally operate as intended, even if the tailgate is damaged or the alignment of the various components of the operating structure otherwise changes to some extent. The compact profile of the linking member requires much less clearance space during operation than do those of the prior art. In addition, the apparatus and method of certain embodiments of the present invention may provide other advantages that have not yet been discovered. It should be understood that while a preferred embodiment is described in connection with an ejector truck, the present invention is readily adaptable to provide similar functions for other work machines. Other aspects, objects, and advantages of the present invention can be obtained from a study of the drawings, the disclosure, and the appended claims.

While aspects of the present invention have been particularly shown and described with reference to the preferred embodiment above, it will be understood by those skilled in the art that various additional embodiments may be contemplated without departing from the spirit and scope of the present invention. However, a device or method incorporating such an embodiment should be understood to fall within the scope of the present invention as determined based upon the claims below and any equivalents thereof.

What is claimed is:

1. A tailgate assembly, comprising:
    a tailgate pivotally attached to a retention body; and
    an operating structure comprising:
        a linear actuator attached to the retention body; and
        a linking member having a first end portion pivotally attached to the linear actuator, a fulcrum pivotally attached to the retention body, and a second end portion attached to a tracking member, the tracking member being adapted to contact the tailgate and move vertically with respect to the tailgate.

2. The tailgate assembly of claim 1, wherein the tracking member is at least one of a type chosen from the group consisting of a sliding face, a sliding pad, and a roller.

3. The tailgate assembly of claim 1, wherein the linear actuator is a hydraulic cylinder.

4. The tailgate assembly of claim 1, wherein the linear actuator is attached to an underneath of the retention body.

5. The tailgate assembly of claim 4, wherein the fulcrum is located between the linear actuator and an end portion of the retention body.

6. The tailgate assembly of claim 1, wherein the linear actuator has a first end and a second end, and one of the first and second ends is attached to the retention body, and the other of the first and second ends is attached to the first end portion of the linking member.

7. The tailgate assembly of claim 6, wherein the first end is a rod end of a linear actuator and the second end is a head end of the linear actuator.

8. The tailgate assembly of claim 1, wherein the tailgate has a lower portion located adjacent the platform and an upper portion spaced vertically from the lower portion, and wherein the tracking member contacts the tailgate at the lower portion when the tailgate is in a closed position and the tracking member contacts the tailgate at the upper portion when the tailgate is in an open position.

* * * * *